United States Patent [19]

Stickney

[11] 4,023,312

[45] May 17, 1977

[54] GRILL CLEANING APPARATUS

[76] Inventor: Jon O. Stickney, P.O. Box 89, Lewiston, Idaho 83501

[22] Filed: Sept. 8, 1975

[21] Appl. No.: 611,118

[52] U.S. Cl. .......................... 51/205 R; 51/170 MT
[51] Int. Cl.² .......................................... B23F 21/03
[58] Field of Search ...... 51/205 R, 170 R, 170 MT, 51/170 TL, 382, 386, 387; 15/244 R

[56] References Cited

UNITED STATES PATENTS

| 224,970 | 2/1880 | Teter | 51/205 R |
| 2,280,767 | 4/1942 | Ferragano | 51/205 R |
| 2,430,991 | 11/1947 | O'Brien | 51/205 WG |
| 3,267,622 | 8/1966 | Frostad | 51/384 |

*Primary Examiner*—James L. Jones, Jr.
*Attorney, Agent, or Firm*—Paul F. Horton

[57] ABSTRACT

A grill cleaning device comprising a carriage, stationary end plates and spring loaded side-plates. A cubical, abrasive, cleaning element is temporarily captively held within the confines of the carriage, end plates and side plates. Provisions for convenient conversion from manual to electrical power for oscillating the grill cleaning element over the grill surface are included.

2 Claims, 3 Drawing Figures

GRILL CLEANING APPARATUS

BACKGROUND OF THE INVENTION

1. Field of the Invention

This invention relates generally to grill cleaning devices and in particular to hand held grill cleaning devices and even more particularly to grill cleaning devices which are readily convertible from manual to electrically powered operation.

2. Description of the Prior Art

It has long been recognized that the use of pumice, brick, and other abrasives are desirable cleaning elements for cleaning and polishing the tops of grills used in the preparation of food. It has further been recognized that abrasives of differing textures and materials are desirable for particular grill-cleaning jobs. For many years such abrasives were hand held with resultant burning and scratching of hands. More recently, grill brick holders have been developed which allow for changing bricks. While functional, these devices include clamping devices which are time consuming to operate and can cause brick crumbling or rupture. Other prior art devices have quick release springs but require specially made keyed or slotted bricks.

Additionally, in the past grill cleaning devices have required manual power for operation and are not readily convertible to electrical power. Prior art patents such as O'Brien, U.S. Pat. No. 2,430,991; Ferragano, U.S. Pat. No. 2,280,767; and Teter, U.S. Pat. No. 224,970 illustrate abrasive holding devices well known in the art. These patents disclose clamp screw with holder means for engaging the brick. Phillips, U.S. Pat. No. 3,120,084 discloses a quick release mechanism in combination with a slotted brick.

SUMMARY OF THE INVENTION

The present invention comprises a device for grill cleaning which includes a carriage, side plates which are pivotally attached and spring loaded, immovable end plates, removable grill abrasives and a means for oscillating the grill abrasives.

It is an object of the present invention, therefore, to provide a grill cleaning device that may be operated manually, or electrically.

More particularly, it is an object of the present invention to provide a grill cleaning device that has an electric motor as a grill cleaning driving means.

Another object of the present invention is to provide a grill cleaning device that is readily adaptable to accomodate a variety of grill cleaning abrasives.

Even more particularly it is an object to provide quick release and replacement means for a variety of grill cleaning abrasives.

Still more specifically it is an object to provide a motor driven grill cleaner with rapidly changeable grill cleaning elements without use of screw clamps.

Another object of the present invention is to provide a grill cleaner with rapidly changeable grill cleaning elements which has immovable end plates which prevent back and forth movement of the cleaning element within the apparatus.

A still further object of the present invention is to provide a grill cleaning device which is motor driven and which utilizes a resilient block as a complement to a screen abrasive.

Additional objects and advantages will become apparent from the following description taken in conjunction with the appended drawings.

DETAILED DESCRIPTION OF THE INVENTION

Figure 1:
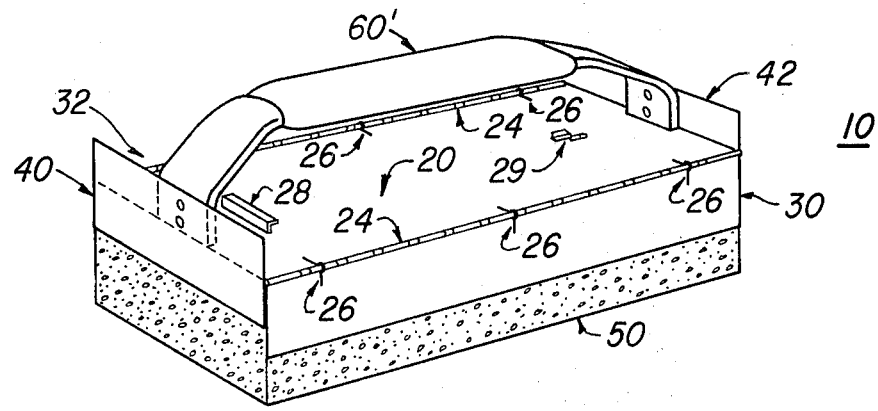
FIG. 1 is an elevated oblique view of the device showing a handle for manual operation and pumice as the grill cleaning element.

Referring now to FIG. 1, a typical embodiment of grill cleaning device 10, made according to the present invention, is disclosed. Grill cleaning device 10, described generally, comprises a carriage 20, a pair of side plates 30 and 32 pivotally attached to the carriage, a pair of stationary end plates 40 and 42, a grill cleaning element 50, and means for oscillating the grill cleaning element, handle 60'.

Carriage 20 comprises essentially a flat, rectangular piece of material of sufficient strength and thickness to support a hand held motor and to support end plates 40 and 42 in an immovable position. The carriage is preferably of such size as to accomodate standard sized grill cleaning bricks on its underside. Welded or otherwise attached to the lateral edges of the carriage are hinges 24 by which means side plates 30 and 32 are pivotally connected to the carriage. A piano type hinge is preferred. Mounted to the outer surfaces of carriage 20 and connected to and between side plates 30 and 32 and the carriage are springs 26 which maintain a constant inward clamping pressure on the side plates and therefore on the enclosed cleaning element 50. Secured to the inner surface of the side plates by weld or by rivet are a plurality of spikes 34 for tightly gripping without fracturing cleaning element 50, as may best be seen in FIG. 2.

End plates 40 and 42 are immovably mounted by weld to the end most portions of carriage 20 so as to form an upper lip extending above and perpendicular to the upper surface of the carriage and a lower lip extending below the lower surface of the carriage. The lower lips function to hold the cleaning element 50 so as to prevent back and forth movement relative to the carriage and thereby prevent excessive abrasion between the carriage and the cleaning element. The upper lips contain holes which provide a means of attachment for handle 60' by screws and nuts, not shown. The carriage, end plates, and side plates may be formed of thermo-plastic or any of a number of non-corrosive metals. In the preferred embodiment, stainless steel is the preferred material. Handle 60' is made of wood or other insulative material.

Figure 2:
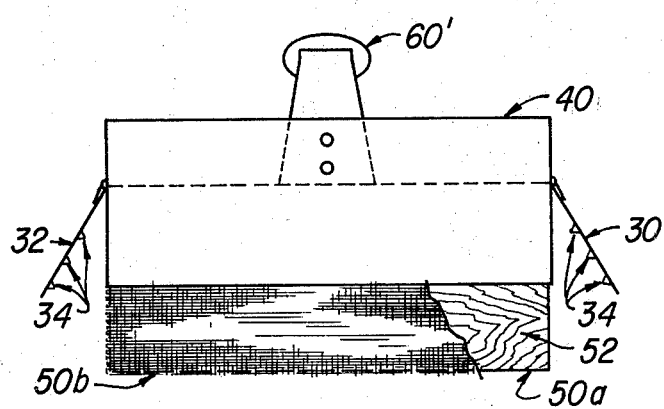
FIG. 2 is a frontal view showing use of a block filler and screen as the grill cleaning element.

In one preferred embodiment of the invention, the grill cleaning element comprises a grill brick containing pumice, designated 50 in FIG. 1. An alternate preferred embodiment as shown in FIG. 2 includes a filler block 50a made preferably from hard rubber and a screen 50b wrapped around the sides and bottom surface of the filler block. Any material having a suitable abrasive surface may be used as a grill brick; the fineness or coarseness of texture depending upon the job required. The filler block should be made of a substance that is resilient so as to hold the screen mesh in place. Screen meshes may be comprised of thermoplastic material or non-corrosive metal; stainless steel being the preferred material.

Figure 3:
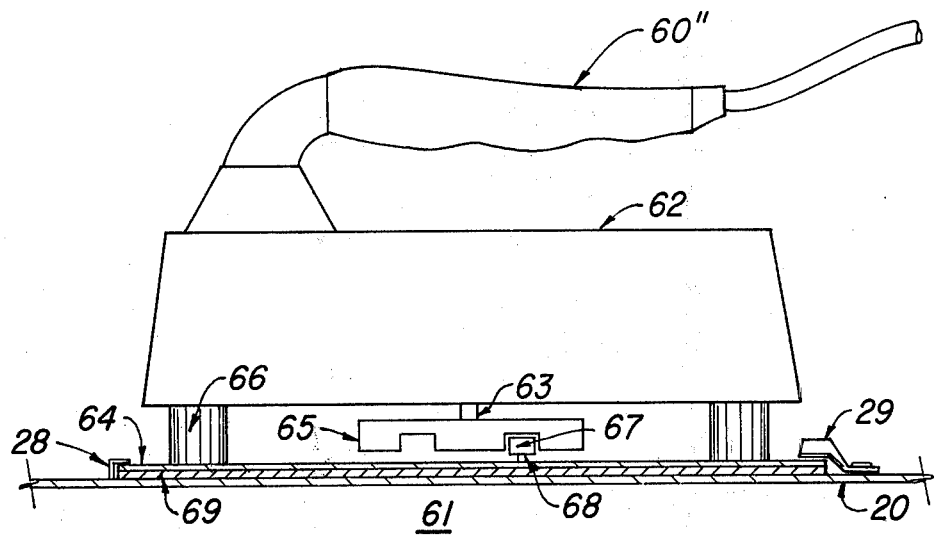
FIG. 3 is a side view showing the motor drive.

The means for oscillating the grill cleaning element may be either manually operated or electrically operated. As used in this description and in the appended claims, the word "oscillating" means movement of any type but in particular an orbital or reciprocating movement. Manual means for oscillating the grill cleaning element is shown in FIGS. 1 and 2 and comprises a handle 60' as previously described. Electrical oscillating means includes a conventional type inductance motor 62 of suitable size, power and speed, best seen in FIG. 3. The motor is mounted upon base plate 64 by means of four rubber bushings 66 and screws and bolts, not shown. Base plate 64 has attached to its underside by an adhesive, a resilient pad 69, preferably composed of rubber. Drive shaft 63 of inductance motor 62 is attached to a cam 65 containing a circular slot concentric about its axis in which cam follower 67 rides. Cam follower 67 is rotatably mounted on shaft 68 which may be immovably attached to base plate 64. Base plate 64, with the attached rubber pad 69, is temporarily fastened to carriage 20 by slipping the end portion of the base plate into the slot created by flange 28. The rearmost portion of the base plate is temporarily attached by lock nut 29.

Mounted upon the top-most portion of inductance motor 62 is a handle 60" which may contain switch means for turning power on and off and changing the speed of the motor. In operation, it may be seen that power from the motor 62 is transmitted through shaft 63 causing cam 65 to rotate. Rotation of the cam is transmitted through the cam follower 67 and its shaft 68 to base plate 64. Rubber bushings 66 allow for orbital motion of the base plate and the attached carriage and grill cleaning element. Rubber pad 69 prevents abrasion between base plate 64 and carriage 20 and also reduces the noise level. It is to be understood that reciprocal movement of the grill cleaning may similarly be accomplished.

It is to be noted that the present invention is readily convertible from manual to electrical operation by replacing handle 60' with motor and cam assembly 61.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for grill cleaning which comprises:
    a carriage;
    a pair of side plates pivotally secured to and downwardly depending from said carriage, each of said side plates including a plurality of inwardly projecting spikes for engaging a grill brick, and at least one constant force spring acting between the carriage and side plate for placing a constant inward pressure on a grill brick;
    a pair of end plates immovably secured to the terminal ends of said carriage; and
    a grill brick located between said end plates and said side plates.

2. The structure as set forth in claim 1, further comprising
    a handle, removably attached to said end plates.

* * * * *